US005299931A

United States Patent [19]
Lee

[11] Patent Number: 5,299,931
[45] Date of Patent: Apr. 5, 1994

[54] BARBECUE STOVE WITH EASILY OPERATING CHARCOAL-ACCESSIBLE GRILL

[76] Inventor: Ping-Chang Lee, c/o Hung Hsing Patent Service Center, P.O. Box 55-1670, Taipei (10477), Taiwan

[21] Appl. No.: 51,871

[22] Filed: Apr. 26, 1993

[51] Int. Cl.$^5$ .............................................. F24B 3/00
[52] U.S. Cl. ...................................................... 431/25
[58] Field of Search ...................................... 126/25 R

[56] References Cited

U.S. PATENT DOCUMENTS

| 3,200,806 | 8/1965 | Goldstein | 126/25 R |
| 4,510,855 | 4/1985 | Avner | 126/25 R |
| 5,165,385 | 11/1992 | Doolittle et al. | 126/25 R |

Primary Examiner—Carroll B. Dority

[57] ABSTRACT

A barbecue stove includes a grill having transverse grill rods and longitudinal grill rods mounted on a rim placed on an upper portion of a stove body for barbecuing use, and a slide grating member slidably engageable with the grill rods normally shielding a charcoal-accessible opening cut out in the grill rods, whereby upon a sliding movement of the slide grating member to uncover the charcoal-accessible opening, new charcoal can be charged into the stove body through the opening or any tool can be inserted through the opening to condition the burning charcoal put on a charcoal grate at a lower portion in the stove body without removing the foods previously loaded on the slide grating member for convenient barbecuing purpose.

3 Claims, 5 Drawing Sheets

BARBECUE STOVE WITH EASILY OPERATING CHARCOAL-ACCESSIBLE GRILL

BACKGROUND OF THE INVENTION

A. Goldstein disclosed a folding barbecue construction in his U.S. Pat. No. 3,200,806 having a hinged section (56) pivotally secured to the grating member (54) to allow ingress of fuel into the interior of the grill. However, when charging charcoal into the grill through such a hinged section (56), it should be pivotally opened to therefore slide or decant any foods originally broiled and positioned on the hinged section (56), unless those foods previously rested on the hinged section (56) is moved before pivotally opening the hinged section (56). After finishing the charcoal ingress job, the hinged section (56) should be re-closed and the goods may be re-located thereon, causing a very inconvenient barbecuing or cooking.

SUMMARY OF THE INVENTION

The object of the present invention is to provide a barbecue stove including a grill having transverse grill rods and longitudinal grill rods mounted on a rim placed on an upper portion of a stove body for barbecuing use, and a slide grating member slidably engageable with the grill rods normally shielding a charcoal-accessible opening cut out in the grill rods, whereby upon a sliding movement of the slide grating member to uncover the charcoal-accessible opening, new charcoal can be charged into the stove body through the opening or any tool can be inserted through the opening to condition the burning charcoal put on a charcoal grate at a lower portion in the stove body without removing the foods previously loaded on the slide grating member for convenient barbecuing purpose.

DETAILED DESCRIPTION

Figure 1:
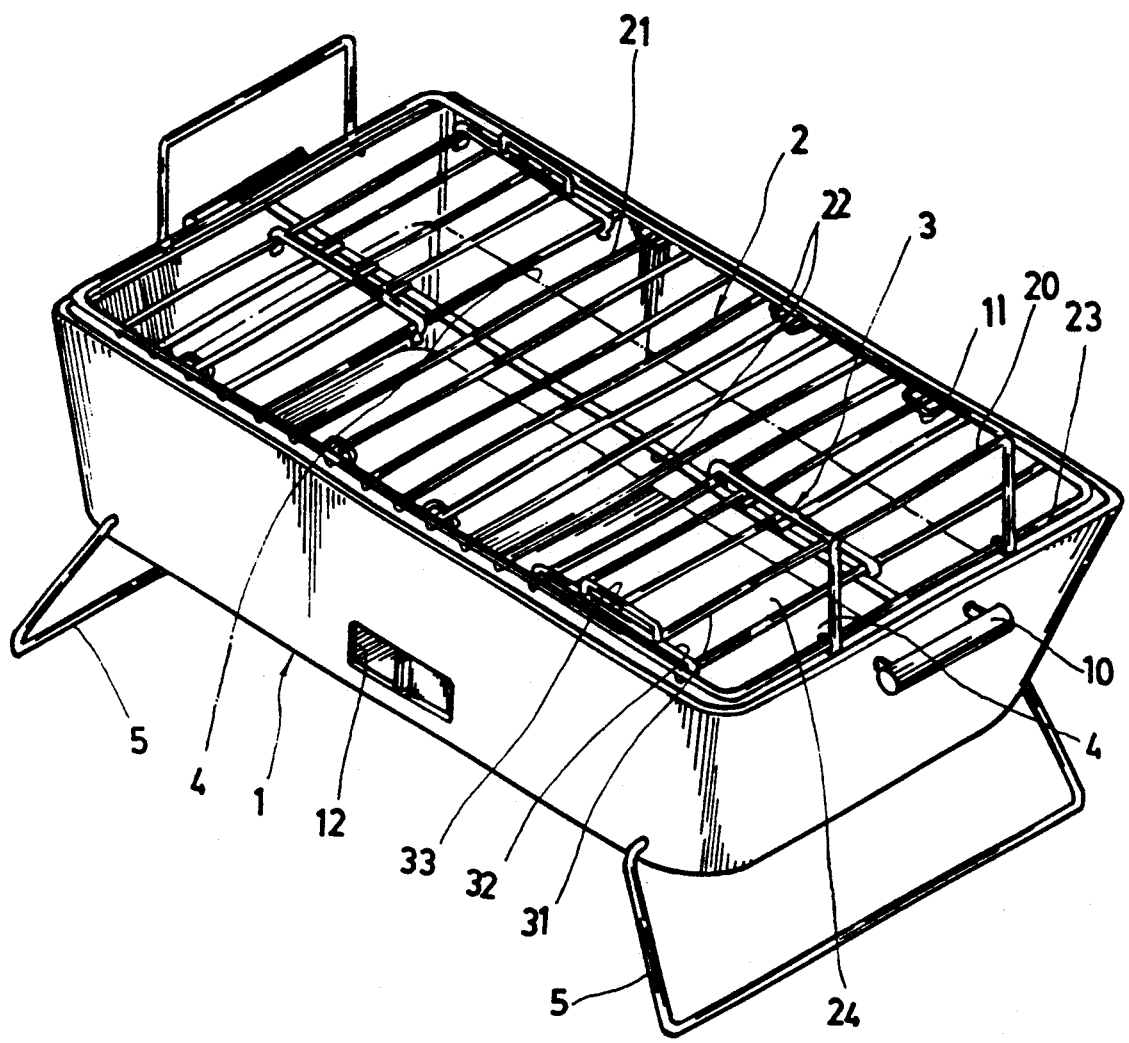
FIG. 1 is a perspective view of the present invention.
Figure 3:
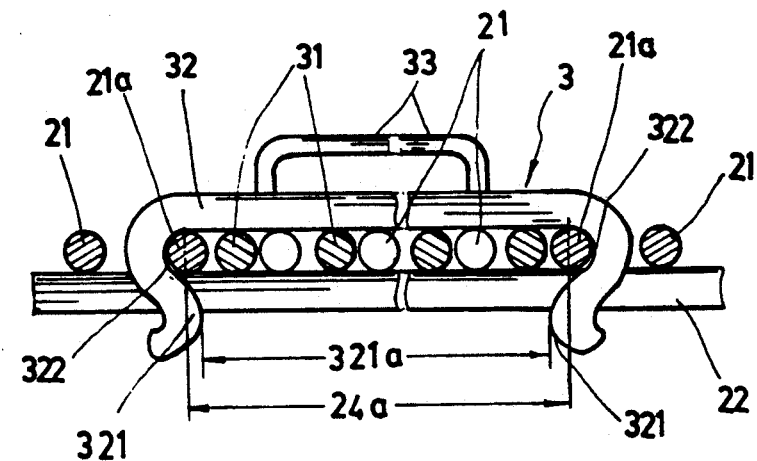
FIG. 3 is a partial sectional drawing when viewed from 3—3 direction of FIG. 2.
Figure 2:
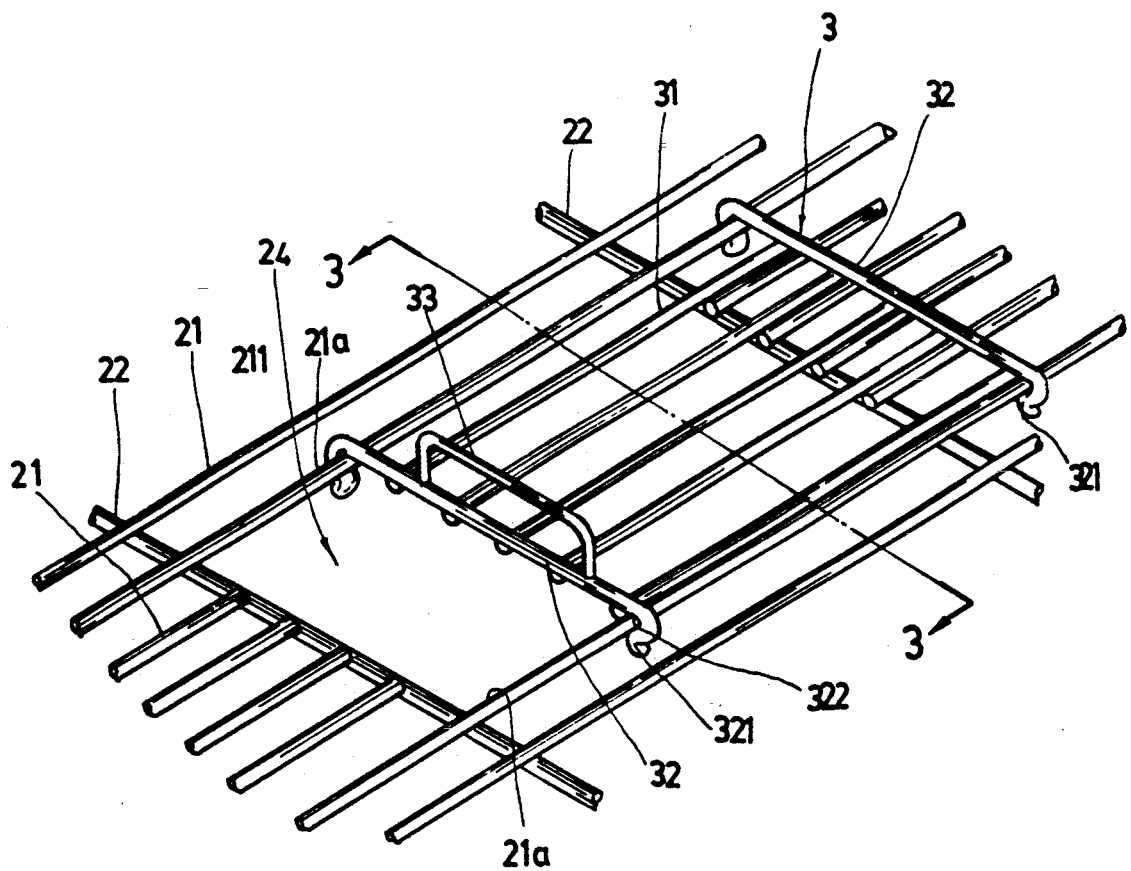
FIG. 2 is a partial enlargement of the slide grating member in accordance with the present invention.
Figure 4:
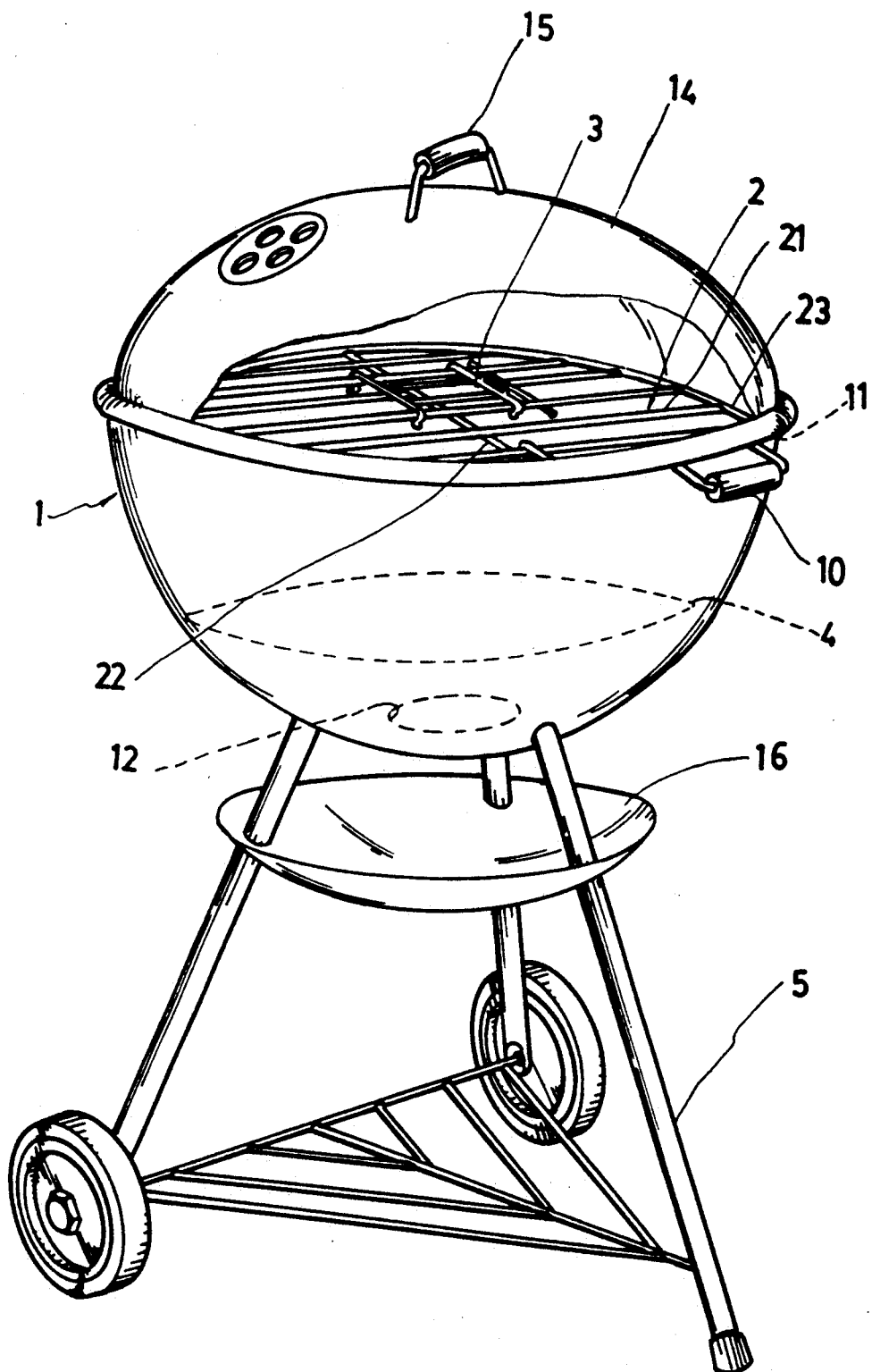
FIG. 4 shows a round shaped stove body of the present invention.

As shown in FIGS. 1-3, the present invention comprises: a stove body 1, a grill 2, at least a slide grating member 3 slidably engageable on the grill 2, a charcoal grate 4 secured in a lower portion of the stove body 1, and a plurality of supporting leg members 5 secured to a bottom of the stove body 1 for supporting the stove body 1. The stove body 1 may be or may not be provided with a top cover thereon. In FIG. 4, there is provided with a top cover 14 having a cover handle 15 secured thereon for covering the grill 2 and stove body 1. An ash catcher 16 may be provided under the stove body 1 for collecting carbon ash burned from the charcoal in the stove body 1.

The stove body 1 includes two grips 10 secured to an upper portion of the stove body 1, a plurality of brackets 11 formed on an upper portion of the stove body 1 for supporting the grill 2 on the stove body 1, and a drafting opening 12 is formed in a lower portion of the stove body 1 for ventilation purpose. The stove body 1 may be rectangular shape as shown in FIG. 1 or spherical shape as shown in FIG. 4, which is not limited in this invention. Since the stove body is too conventional to be mentioned in detail in this invention.

The grill 2 as shown in FIGS. 1-3 includes: a plurality of transverse grill rods 21 juxtapositionally secured to a plurality of longitudinal grill rods 22 confined within a rim 23 which is embedded, placed, or mounted on an upper portion of the stove body 1, and a charcoal-accessible opening 24 formed in the grill 2 to be covered by the slide grating member 3 by cutting out partial transverse grill rods 21 between two adjacent longitudinal grill rods 22 to thereby define the charcoal-accessible opening 24 within two adjacent separated longitudinal grill rods 22 and two transverse grill rods 21a parallel each other and separated with a suitable width 24a therebetween. A pair of grill handles 20 may be provided on two opposite side portions of the grill 2 for portable use.

The slide grating member 3 especially as shown in FIG. 2 includes: a plurality of transverse grating rods 31 juxtapositionally secured to two longitudinal grating rods 32 which are longitudinally disposed on two opposite sides of the slide grating member 3 to be parallel to the longitudinal grill rods 22 of the grill 2 and slidably engageable with two adjacent transverse grill rods 21a of the charcoal-accessible opening 24, and a slide handle 33 secured to one said longitudinal grating rod 32 for manipulating the slide grating member 3 for uncovering or closing the charcoal-accessible opening 24.

Each longitudinal grating rod 32 of the slide grating member 3 is formed with two opposite arcuate rod ends 321 respectively bent inwardly to face each other as shown in FIG. 3 to define a distance 321a between the two arcuate rod ends 321 which is slightly shorter than a width 24a of the charcoal-accessible opening 24 confined between two adjacent transverse grill rods 21a for a resilient coupling of the longitudinal grating rod 32 on the transverse grill rods 21 by downwardly depressing the longitudinal grating rod 32 onto the transverse grill rods 21a for stably slidably mounting the slide grating member 3 on the grill 2.

Each longitudinal grating rod 32 has two sliding grooves 322 each groove 322 adjacent to each arcuate rod end 321 and slidably engageable with each transverse grill rod 21a of the grill 2 for a sliding movement of the slide grating member 3 on the grill 2.

By using a stove of the present invention, even the area of the slide grating member 3 can be loaded with foods for barbecuing the foods and the foods need not to be removed from the slide grating member 3. Once charging new charcoal into the stove body 1, the slide grating member 3 can be laterally slid to uncover the opening 24 for feeding charcoal or for conditioning the burning of charcoal for a very convenient barbecuing.

The two arcuate rod ends 321 of the longitudinal grating rod 32 of the slide grating member 3 can be quickly snapped into two adjacent transverse grill rods 21a for slidably embedding the slide grating member 3 on the grill 2 for a very quick assembly of the present invention. The rod ends 321 may also serve as stoppers for limiting the movement of the slide grating member 3 which may be obstructed by the longitudinal grill rod 22 for stopping the sliding movement of the grating member 3 when opening or closing the opening 24. The arcuate ends 321a can be easily disengaged from the rods 21a for easy cleaning and maintenance.

Figure 5:
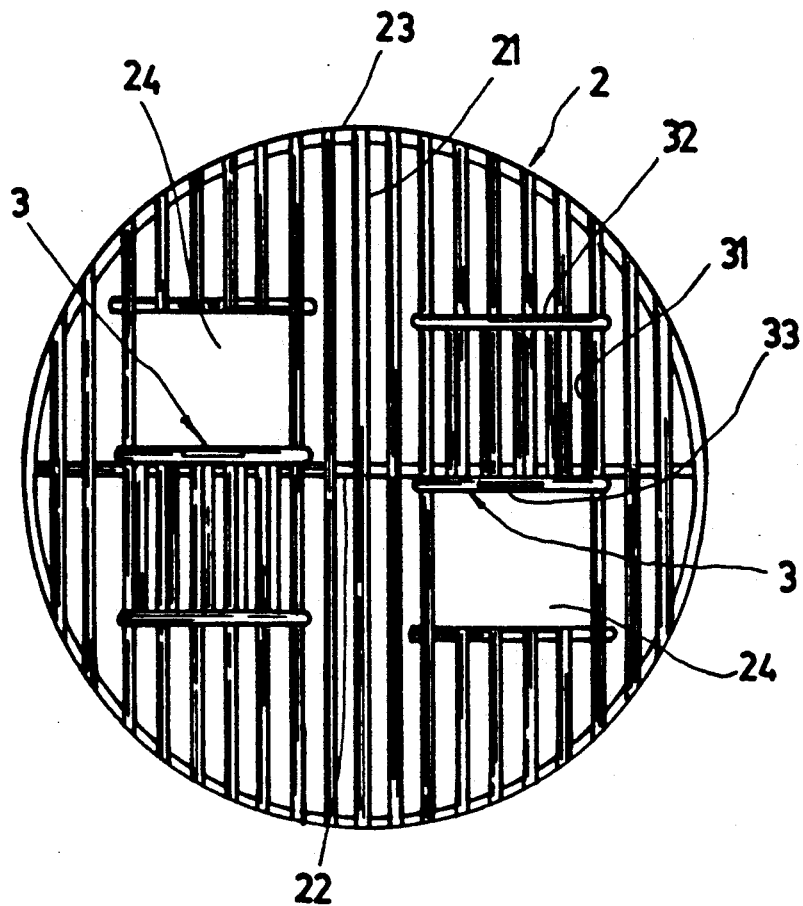
FIG. 5 shows a round shaped grill in accordance with the present invention.
Figure 6:
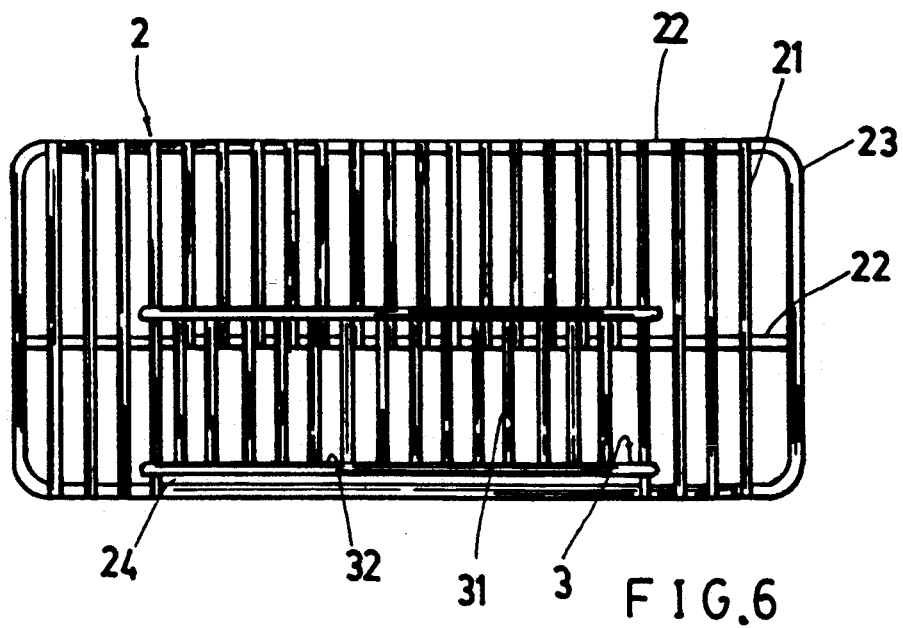
FIG. 6 shows a grill and slide grating member of rectangular shape in accordance with the present invention.
Figure 7:
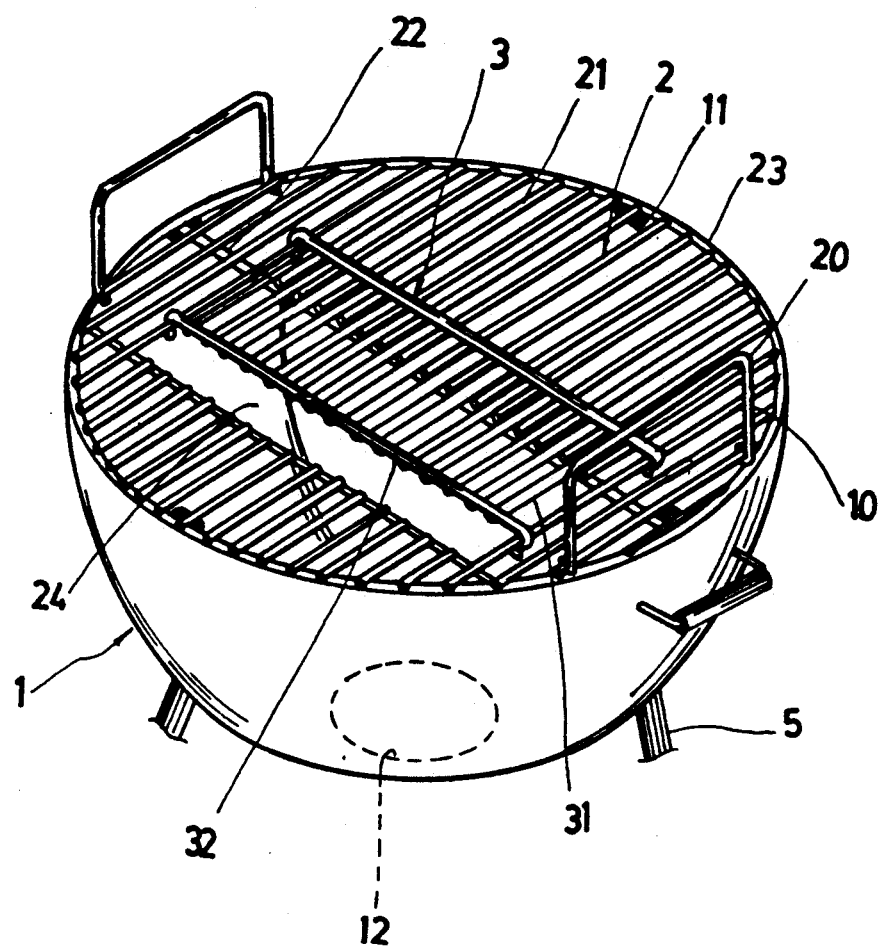
FIG. 7 shows a round stove with round grill but with elongated rectangular slide grating member in accordance with the present invention.

FIGS. 4, 5 show a round or spherical shaped stove in accordance with the present invention. In FIGS. 6, 7, an elongated rectangular slide grating member 3 is provided to have optional choices in this invention.

The shapes, network design of the transverse and longitudinal rods, the number and location of the slide grating member 3 are not limited in this invention, which may be modified by those skilled in the art without departing from the spirit and scope as claimed in this invention.

I claim:

1. A barbecue stove comprising: a grill having a plurality of transverse grill rods and longitudinal grill rods juxtapositionally mounted on a rim placed on an upper portion of a stove body for barbecuing use, and a slide grating member slidable engageable with respective grill rods on said grill for normally shielding a charcoal-accessible opening cut out in the grill rods of said grill, whereby upon a sliding movement of the slide grating member to uncover the charcoal-accessible opening, new charcoal can be charged into the stove body through said opening;

said grill including: a plurality of said transverse grill rods juxtapositionally secured to a plurality of said longitudinal grill rods confined within said rim which is mounted on an upper portion of the stove body, and the charcoal-accessible opening formed in the grill to be covered by the slide grating member by cutting out a plurality of transverse grill rods between two adjacent longitudinal grill rods to thereby define the charcoal-accessible opening within two said adjacent separated longitudinal grill rods and two adjacent transverse grill rods parallel each other and separated with a width therebetween;

said slide grating member including: a plurality of transverse grating rods juxtapositionally secured to two longitudinal grating rods longitudinally disposed on two opposite sides of the slide grating member to be parallel to the longitudinal grill rods of the grill and slidably engageable with two adjacent transverse grill rods of the charcoal-accessible opening, and a slide handle secured to one said longitudinal grating rod for manipulating the slide grating member for uncovering or closing the charcoal-accessible opening; and each said longitudinal grating rod of the slide grating member formed with two opposite arcuate rod ends respectively bent inwardly to face each other to define a distance between the two said arcuate rod ends, said distance being slightly shorter than a width of the charcoal-accessible opening confined between two adjacent transverse grill rods of said grill for resilient coupling of the longitudinal grating rod of the slide grating member on the transverse grill rods of said grill for stably slidably mounting the slide grating member on the grill.

2. A barbecue stove according to claim 1, wherein each said longitudinal grating rod has two sliding grooves each said groove adjacent to each said arcuate rod end and slidably engageable with each said transverse grill rod of the grill for a sliding movement of the slide grating member on the grill.

3. A barbecue stove according to claim 1, wherein each said arcuate rod end of said longitudinal grating rod is formed as a stopper which is limited by one said longitudinal grill rod to stop a sliding movement of said slide grating member on said grill.

* * * * *